United States Patent
Kaskawitz et al.

(10) Patent No.: US 7,849,987 B2
(45) Date of Patent: Dec. 14, 2010

(54) CENTRIFUGAL BLADE BRAKE CLUTCH APPARATUSES AND METHODS (75) Inventors: Scott Kaskawitz, Burlington, NC (US); Brian Bender, Mebane, NC (US); Christopher M. Osborne, Efland, NC (US)

(73) Assignee: Honda Motor Co., Ltd., Tokyo (JP)

( * ) Notice: Subject to any disclaimer, the term of this patent is extended or adjusted under 35 U.S.C. 154(b) by 707 days.

(21) Appl. No.: 11/789,987

(22) Filed: Apr. 26, 2007

(65) Prior Publication Data
US 2008/0264027 A1   Oct. 30, 2008

(51) Int. Cl.
F16D 67/02 (2006.01)
F16D 43/18 (2006.01)

(52) U.S. Cl. ............... 192/14; 192/105 BA; 192/103 B (58) Field of Classification Search ............... 192/16, 192/105 R
See application file for complete search history.

(56) References Cited

U.S. PATENT DOCUMENTS

| | | | |
|---|---|---|---|
| 3,253,391 A | 5/1966 | Meldahl | |
| 4,035,994 A | 7/1977 | Hoff | |
| 4,044,533 A | 8/1977 | Wick | |
| 4,148,173 A * | 4/1979 | Hoff | 56/11.3 |
| 4,221,108 A | 9/1980 | Owens | |
| 4,226,313 A * | 10/1980 | Meldahl et al. | 192/18 R |
| 4,309,862 A | 1/1982 | Carlson | |
| 4,316,355 A | 2/1982 | Hoff | |
| 4,372,433 A * | 2/1983 | Mitchell et al. | 192/18 R |
| RE32,202 E * | 7/1986 | Cody et al. | 56/11.3 |
| RE32,730 E | 8/1988 | Wick | |
| 6,464,055 B1 | 10/2002 | Wians | |
| 6,754,962 B2 * | 6/2004 | Warashina et al. | 30/276 |
| 7,111,715 B2 * | 9/2006 | Omata et al. | 192/16 |

* cited by examiner

Primary Examiner—David D Le
Assistant Examiner—Ryan Dodd
(74) Attorney, Agent, or Firm—Jenkins, Wilson, Taylor & Hunt, P.A.

(57) ABSTRACT

Centrifugal blade brake clutch apparatuses and methods are provided. In one aspect, a centrifugal blade brake clutch includes a rotatable clutch housing having an axis extending therethrough. The clutch housing can have a base and side walls. The clutch housing also can have a brake surface thereon and an integral clutch surface disposed on a side wall surface of the side walls. At least one centrifugally extendable clutch shoe device can be disposed within the clutch housing and configured for engaging the integral clutch surface of the clutch housing. A brake assembly can be positioned proximal to the clutch housing with the axis of the clutch housing passing therethrough. The brake assembly can include a brake member that has a braking surface and is configured to move in a direction parallel with the axis of the clutch housing to axially engage the brake surface of the clutch housing with the braking surface of the brake member.

34 Claims, 7 Drawing Sheets

CENTRIFUGAL BLADE BRAKE CLUTCH APPARATUSES AND METHODS

TECHNICAL FIELD

The subject matter disclosed herein relates generally to clutching mechanisms and braking mechanisms for rotatable blades. More particularly, the subject matter disclosed herein relates to centrifugal blade brake clutch apparatuses and methods that can be used to brake blades in power equipment including but not limited to mowers, tillers, snow blowers, and tractors.

BACKGROUND

Conventional power equipment, such as mowing equipment for example, can include a clutch that selectively engages a blade or blades associated with an engine output member. A brake can also be included that retards the rotation of the blade when the blade is disengaged from the engine output member. The combination of these two coupling devices permits an operator to control the movement of mower blade independent of the engine output member. Typically, the components utilized in the clutch are separate and distinct from those employed by the brake and provide a bulky complicated arrangement.

Separate and distinct components are used for power equipment that includes a centrifugal clutch within a blade brake system. For example, in a centrifugal blade brake mechanism, a clutch drum that can be engaged with a peripheral brake caliper assembly is often used. The clutch drum houses clutch shoes that are configured to extend during rotation in order to engage the clutch drum to spin the blade at specified rotational speeds. To brake the clutch drum to prevent rotation after disengagement of the brake shoes, the brake caliper assembly usually has brake shoes positioned around the side walls of the clutch drum. The brake caliper assembly can tighten the brake shoes around the side walls of the clutch drum to brake the clutch drum. Thereby, the blade attached to the clutch drum stops rotating.

In operation, brake shoes can be applied to a band that can tighten around the clutch drum such that the brakes shoes contact the side walls of the clutch drum to stop its rotation. This arrangement creates a large number of parts for assembly as well as for replacement under routine maintenance. This routine maintenance is further hampered by the need to disassemble a relatively large number of parts to replace the worn or broken parts. The dimensional constraints are another drawback of conventional blade brake and clutch designs. A large surface area is desirable for both the brake and the clutch. However, packaging space often constricts these areas below the optimum values.

Therefore, in light of the above, a need exists for centrifugal blade brake clutch apparatuses and methods that allow for the clutching and braking of a power equipment machine while reducing the number of parts required to construct such a centrifugal blade brake clutch and requiring less space to operate.

SUMMARY

In accordance with this disclosure, novel blade brake clutch apparatuses and methods are provided. It is, therefore, an object of the present disclosure to provide novel blade brake clutching apparatuses and methods for braking blades within power equipment through centrifugal engagement and braking through axial displacement. This and other objects as may become apparent from the present disclosure are achieved, at least in whole or in part, by the subject matter described herein.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which.

DETAILED DESCRIPTION

Reference will now be made in detail to presently preferred embodiments of the present subject matter, one or more examples of which are shown in the figures. Each example is provided to explain the subject matter and not as a limitation. In fact, features illustrated or described as part of one embodiment can be used in another embodiment to yield still a further embodiment. It is intended that the present subject matter cover such modifications and variations.

Figure 1:
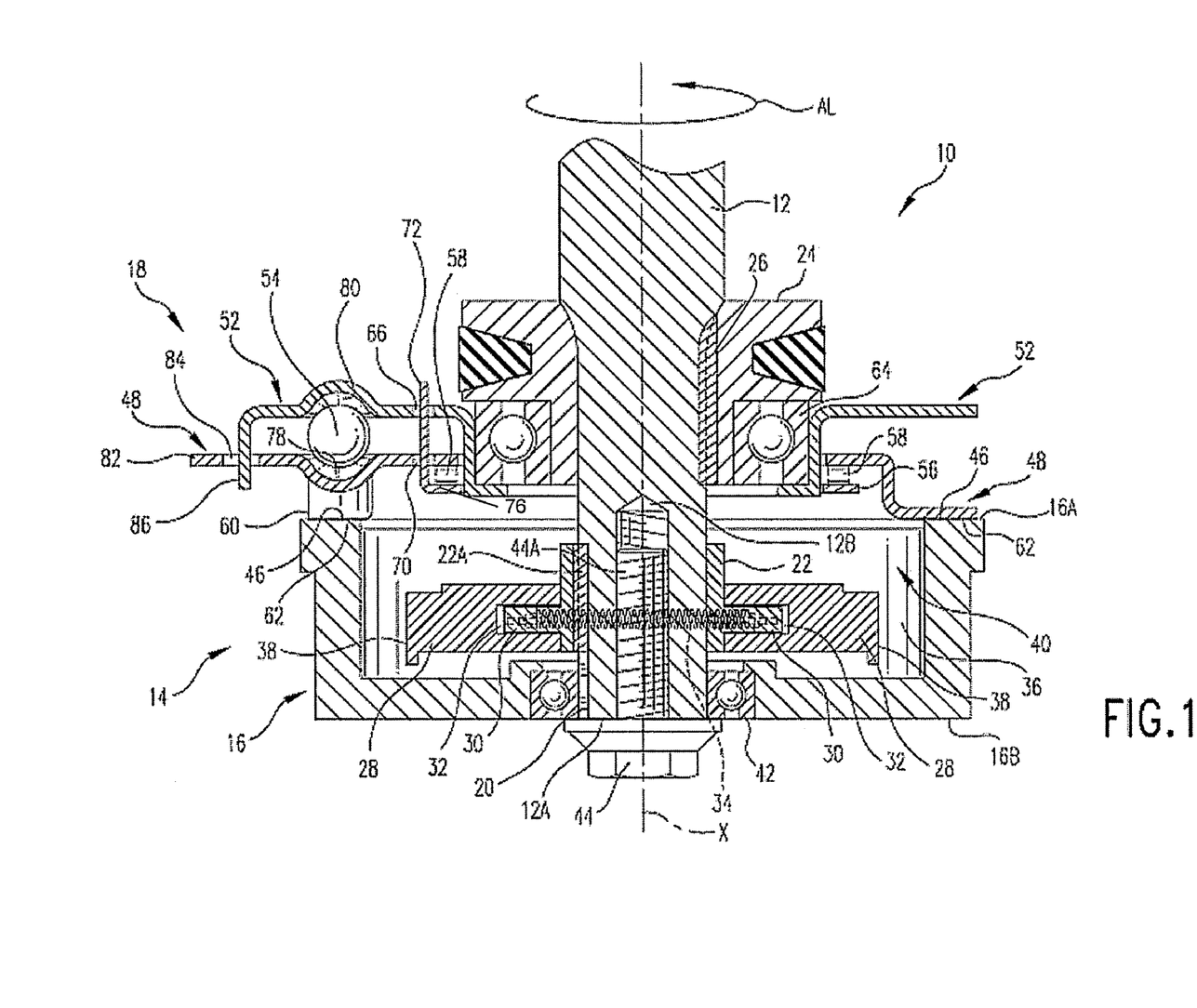
FIG. 1 illustrates a cross-sectional view of an embodiment of a centrifugal blade brake clutch apparatus in a braked position according to the present subject matter.
Figure 2:
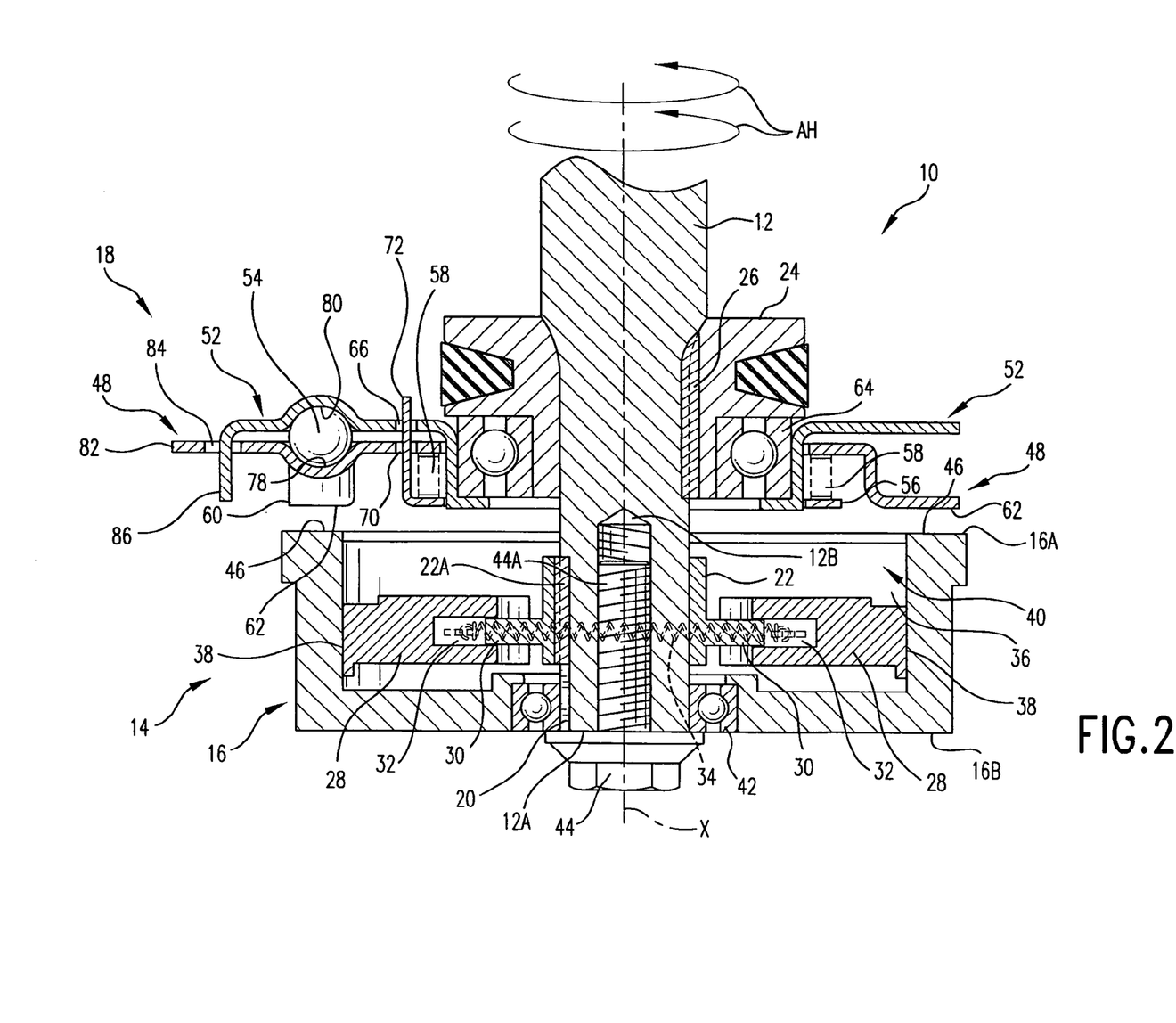
FIG. 2 illustrates a cross-sectional view of the embodiment of a centrifugal blade brake clutch apparatus in an actuated position according to FIG. 1.
Figure 3:
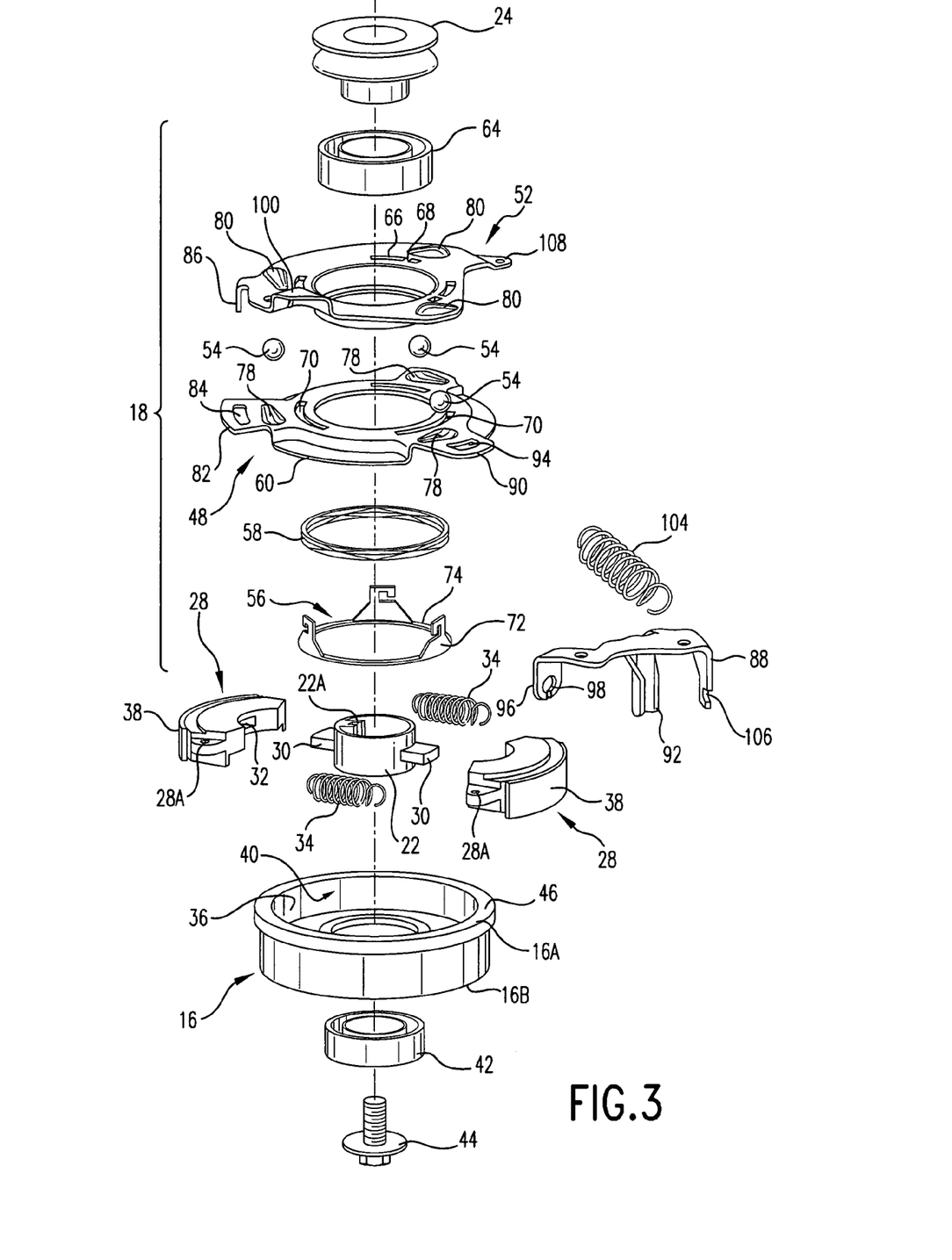
FIG. 3 illustrates an exploded perspective view of the embodiment of a centrifugal blade brake clutch apparatus according to FIG. 1.

FIGS. 1-3 illustrate a drive assembly, generally designated as 10, having a driving member 12 and a driven member, generally designated as 14. Driven member 14 can include clutch housing 16. Drive assembly 10 also can include a brake assembly 18 which can be used to brake clutch housing 16. Driving member 12 can be a shaft connected to a lawnmower engine (not shown). Clutch housing 16 can be a blade holder adapted to carry a mower blade (not shown). For instance, the blade can be bolted to the bottom of the clutch housing in a known manner. In the embodiment shown, driving member 12, clutch housing 16 and brake assembly 18 are aligned along an axis X. As shown in the figures, driving member 12, clutch housing 16 and brake assembly 18 can be coaxially aligned. However, in other embodiments, the axis X can only pass through clutch housing 16 and/or brake assembly 18.

Keyway 20 in driving member 12 permits the affixing of a drive hub 22 to the driving member 12 in a conventional manner. Keyway 20 can allow a key to be placed between fixed drive hub 22 and driving member 12. For example, keyway 20 can permit a fixed key 22A which is a part of the drive hub 22, to be slid into keyway 20 to secure drive hub 22 to driving member 12. Similarly, keyway 20 can be used to secure both drive hub 22 and take-off pulley 24. Alternatively, driving member 12 can form a key which is securable within a keyway in drive hub 22. Similarly, power take-off pulley 24 can be connected to driving member 12 in a conventional manner. For example, a key 26 can be placed within a separate keyway from keyway 20 to secure take-off pulley 24 to driving member 12. Alternatively, drive hub 22 and/or power take-off pulley 24 can be secured to driving member 12 by other mechanical connections such as a built-in key, a tongue and groove, springs, or a snap ring. Drive hub 22 and/or the power take-off pulley 24 can also be integrally formed with driving member 12.

As stated above, driven member 14 can include clutch housing 16. At least one clutch shoe 28 can be used to engage the clutch housing 16. Clutch shoes 28 are retractably extendable from drive hub 22. In their extend position, clutch shoes 28 contact and rotate clutch housing 16 after driving member 12 reaches a specific rotational speed which permits clutch shoes 28 to extend outward from drive hub 22. Drive hub 22 can include shoe wings 30 that extend radially outward from drive hub 22. Clutch shoes 28 each can have a channel 32 in which to receive a respective wing 30 of drive hub 22. Wings 30 can aid in securing clutch shoes 28 in place to prevent them from being misguided when the centrifugal force, which causes the clutch shoes 28 to extend, acts upon the shoes 28.

The number of clutch shoes can vary in different embodiments. In the embodiment shown, two clutch shoes 28 can be secured together by at least one bias element 34 which bias clutch shoes 28 toward drive hub 22 on driving member 12. For example, the bias element 34 can be a spring. As in the embodiment shown, the bias element 34 can be multiple springs 34. While, springs are shown, other bias elements can be used. For example, elastic members such as rubber bands, stretchable cords, and leaf springs or the like can be used.

Spring 34 can be secured to clutch shoes 28 in a conventional manner. For example, a plate can be secured to the clutch shoes to which the springs are attached. Further, the springs can be secured to portions of the clutch shoes 28, for example, projections 28A, to pull the clutch shoes 28 inward toward drive hub 22. As drive member 12 rotates, centrifugal force created by the weight of clutch shoes 28 force clutch shoes 28 outward from driving member 12. As the speed of driving member 12 increases past a specific speed, clutch shoes 28 overcome the bias created by springs 34 and extend outward to contact side walls 36 of clutch housing 16 as shown for example in FIG. 2. Thus, an engagement surface 38 of each clutch shoe 28 engages a clutch surface 40 of side walls 36 of the clutch housing 16 to cause clutch housing 28 to rotate with driving member 12.

A bearing assembly 42 can mount clutch housing 16 onto driving member 12. Bearing assembly 42 can be axially restrained on driving member 12 by a flanged bolt 44 secured to driving member 12. For example, an end 12A of driving member 12 can have a threaded bore 12B therein in which a threaded stem 44A of flanged bolt 44 can be screwed. Bearing assembly 42 can be secured by a press fit, by staking it to either one or both of driving member 12 or clutch housing 16, or by other suitable means.

Bearing assembly 42 permits driving member 12 to rotate relative to clutch housing 16. Thus, when driving member 12 is not rotating at a speed which causes clutch shoes 28 to extend outward to engage side walls 36 of clutch housing 16, bearing assembly 42 allows the rotation of driving member 12 without this rotation transferring directly to clutch housing 16. In this manner, driving member 12 can rotate without clutch housing 16 rotating. It is only when clutch shoes 28 extend outward such that engagement surface 38 engages clutch surface 40 of side walls 36 that clutch housing 16 will begin rotation.

In such a configuration, the power equipment, such as for example a mower, in which drive assembly 10 is used can have an idle speed at which the motor turns driving member 12 through take-off pulley 24 but at which the clutch housing and the blade to which it is attached do not turn. This idleness of the clutch housing 16 and the blade is due to the speed of rotation being low enough that the bias created by springs 34 prevents clutch shoes 28 from extending outward because the biasing force is greater than the centrifugal force created by the weight of clutch shoes 28. Therefore, clutch housing 16 is not engaged by clutch shoes 28 at this lower speed as seen in FIG. 1. When a user is ready to engage the blade of the mower for use, the user can increase the speed of the motor thereby allowing pulley 24 to turn driving member 12 at a higher rotational speed. At this higher rotational speed, centrifugal force created by the weight of clutch shoes 28 can overcome the bias of springs 34 such that clutch shoes 28 extend outward from drive hub 22 so that engagement surface 38 of clutch shoes 28 engages clutch surface 40 of side walls 36 of clutch housing 16. Once engagement surface 38 of clutch shoes 28 sufficiently engage clutch surface 40 of side walls 36 of clutch housing 16, the rotational speed of driving member 12 is transferred to clutch housing 16. Thereby, clutch housing 16 is rotated at the same speed as driving member 12. In this manner, the blade attached to clutch housing 16 is rotated for mowing purposes.

As seen in FIG. 2, clutch shoes 28 are extended from hub 22 thereby stretching springs 34 as engagement surface 38 of clutch shoes 28 engages clutch surface 40 of the side walls 36 of clutch housing 16. When driving member 12 is rotated at a high speed represented by the directional arrows $A_H$, wings 30 of hub 22 stay within channels 32 even when clutch shoes 28 are extended so that the rotational speed of driving member 12 is continuously transferred to clutch shoes 28, which, in turn, transfer the rotational speed to clutch housing 16.

Once the user wants to discontinue rotation of the blade of the mower, the engine can be lowered to a speed that allows the blade to be idle. At such time, driving member 12 rotates at a lower speed represented by the directional arrow $A_L$. At this lower speed, springs 34 overcome the centrifugal force created by the weight of clutch shoes 28, pulling shoes 28 inward toward hub 22 as shown in FIG. 1. At this time, clutch surface 40 of clutch housing 16 is no longer engaged by clutch shoes 28. However, clutch housing 16 can still rotate at a decreasing speed under its own inertia until it stops. In order to immediately stop clutch housing 16, a brake surface 46 on clutch housing 16 can be engaged by a brake member, generally designated as 48, of a brake assembly 18. In this manner, a coupling is created through the frictional engagement of brake surface 46 being engaged by brake member 48 of brake assembly 18.

In the embodiment shown, brake surface 46 is integrally disposed on a top portion 16A of side walls 36. Clutch housing 16 can also include a base 16B. Brake surface 46 can be on base 16B in other embodiments.

Figure 4:
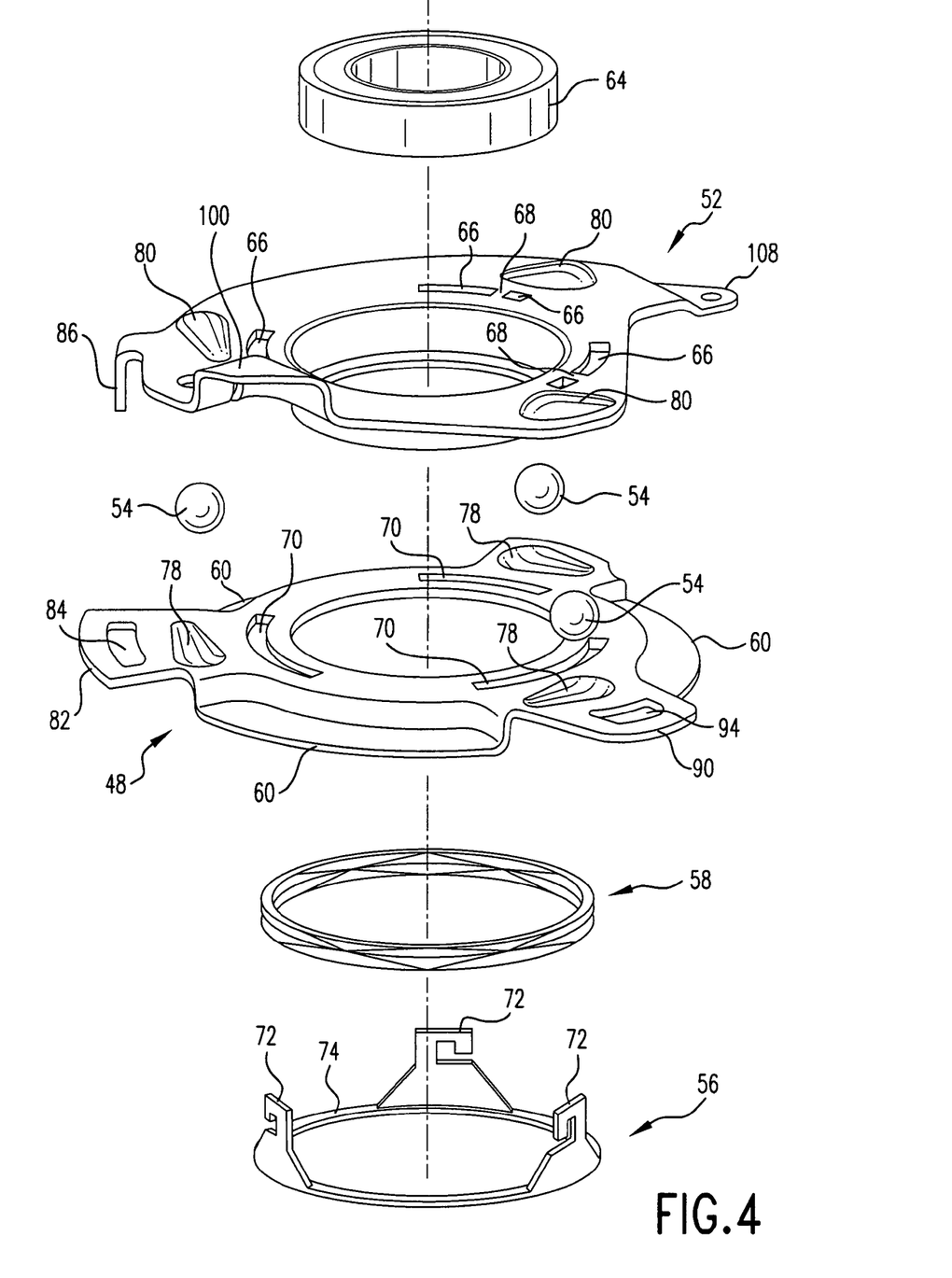
FIG. 4 illustrates an exploded perspective view of an embodiment of a brake assembly of a centrifugal blade brake clutch apparatus according to the present subject matter.

Brake assembly 18 includes brake member 48, a brake actuator 52, a plurality of balls 54, a retainer 56 and compression spring 58. This brake assembly 18 is similar to the brake assembly disclosed in U.S. Pat. No. 6,464,055, the disclosure of which is incorporated herein by reference in its entirety. Compression spring 58 is configured to be compressible to a very small actual thickness. While only one compression spring 58 is typically used in brake assembly 18, a plurality of compression springs can also be used. By using a single compression spring 58, a compact assembly is permitted and the number of parts can be minimized.

Brake assembly 18 can be configured such that brake member 48 is displaced through the interaction of brake actuator 52, the plurality of balls 54, and compression spring 58 on brake member 48. When brake assembly 18 is applied to clutch housing 16, actuator 52 is separated from brake member 48 by the plurality of balls 54, as described further below, causing brake member 48 to move downwardly compressing compression spring 58 and engaging brake surface 46 of clutch housing 16 as seen in FIG. 1. Centrifugal clutch housing 16 can therefore be braked vertically, thereby conserving space within the lawnmower assembly in which the drive assembly 10 is used.

By having brake surface 46 on either a top portion 16A of side walls 36 or base 16B and side walls 36 providing clutch surface 40 for engagement by engagement surfaces 30 of clutch shoes 28, brake surface 46 and clutch surface 40 can be provided on separate surfaces of clutch housing 16 to save space and minimize the number of elements for brake assembly 18. The movement of brake member 48 axially upward and downward in a direction along the axis X shared by driving member 12 and clutch housing 16 to engage and disengage brake surface 46 of either top portion 16A of side walls 36 distal from base 16B or base 16B of clutch housing 16 creates an axially engaged braking system that does not require the braking from an outer periphery of clutch housing 16. This axial brake assembly 18 is less bulky and requires fewer parts than brake systems that brake a clutch housing on its outer periphery.

Brake member 48 can have at least one brake shoe 60. However, brake member 48 can include a plurality of brake shoes 60 circumferentially space about its periphery. Brake shoes 60 can extend axially downward from the bottom of brake member 48. Each brake shoe 60 can have a braking surface 62 that selectively engages brake surface 46 on clutch housing 16. Brake actuator 52 can be axially disposed above brake member 48. Bearing assembly 64 allows brake actuator 52 to be mounted for relative rotation of driving member 12 via power take-off pulley 24. Bearing assembly 64 can be press fitted onto power take-off pulley 24 and brake actuator 52. Alternatively, bearing assembly 64 can be retained by staking bearing assembly 64 to any combination of power take-off pulley 24, brake actuator 52, and driving member 12.

The centrifugal blade brake clutch can be arranged in different ways. For example, the positioning of the clutch housing and brake assembly can be reversed and the brake assembly inverted, such that the brake assembly brakes the clutch housing from the bottom at its base. In another example, the clutch housing can be inverted such that the open end faces downward and the brake surface is on the base.

In the embodiment shown, the braking surface 62 of brake member 48 has a flat surface which matches the flat surface of brake surface 46 on top portion 16A of clutch housing 16. In other embodiments, other matching surfaces can be used as braking surfaces 62 and brake surfaces 46. For example, brake surface 46 can have a concave cross-sectional shape, while braking surface 62 can have a matching convex cross-sectional shape, or vice versa. Further, brake surface 46 and braking surface 62 can have other matching surfaces such as matching slanted surfaces, diverging and converging v-shaped cross-sections, or the like.

The operation and assembly of brake assembly 18 will now be explained in more detail. As can be seen in FIGS. 3 and 4, brake actuator 52 has a plurality of circumferentially space arcuate slots 66. A rib 68 extends across each respective arcuate slot 68. A plurality of arcuate slots 70 is circumferential spaced on brake member 48. A portion of each brake member arcuate slot 70 overlaps a corresponding brake actuator slot 66 with the remainder extending beyond the corresponding brake actuator arcuate slot 66. This overlapping can be seen in FIG. 5.

Retainer 56 is a flat angular disk with a plurality of hooks 72 extending axially upward from the circumference 74 of retainer 56. Retainer 56 is coaxially disposed below brake actuator 52 and radially inside brake shoes 60. Each hook 72 projects through arcuate slots 70 and 66 in brake member 48 and brake actuator 52, respectively. Each hook 72 of retainer 56 is secured to a respective rib 68 of actuator 52. Retainer 56 can be coated with a low friction material, such as polytetra-flouroethylene ("PTFE") or nylon. This low friction coating allows for an easier return of retainer 56 to its neutral position, as will be discussed later.

Compression spring 58 is captured between the bottom of brake member 48 and upper surface 76 of retainer 56 (see FIG. 1). Retainer 56 connects brake member 48 to brake actuator 52, and compression spring 58 biases brake member 48 towards brake actuator 52.

A plurality of ball ramp assemblies form a connection between brake member 48 and brake actuator 52. Each ball ramp assembly comprises incline ball ramp surfaces 78 formed in the brake member 48 and incline ball ramp surfaces 80 formed in brake actuator 52. Ball ramp surfaces 78 of brake member 48 oppose ball ramp surfaces 80 of brake actuator 52. Ball ramp surfaces 78 of brake member 48 are inclined in the opposite direction relative to ball ramp surface 80 of brake actuator 52. A ball 25 is moveably captured between each pair of opposed ball ramp surfaces 78 and 80, respectively.

Figure 5:
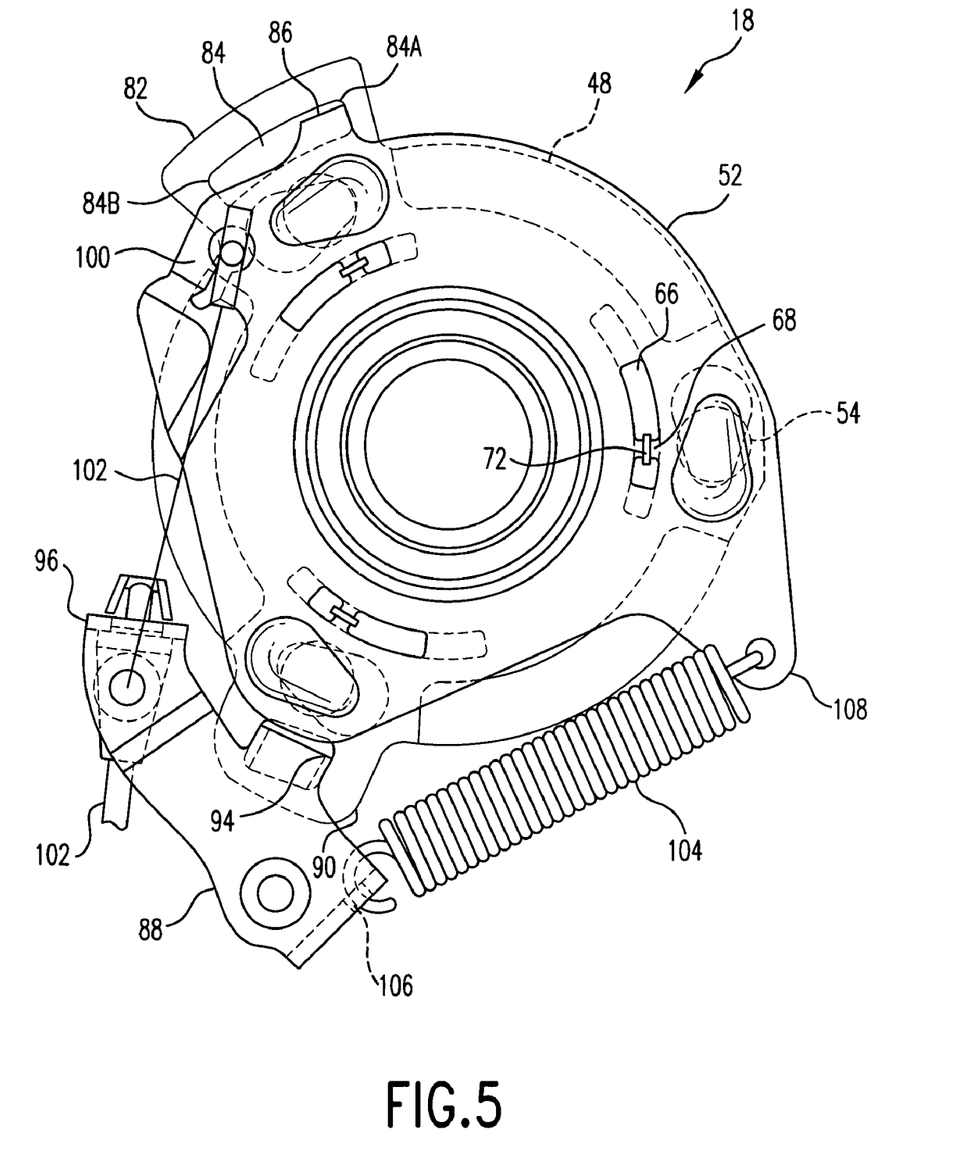
FIG. 5 illustrates an embodiment of the brake assembly of the embodiment of a centrifugal blade brake clutch apparatus in a braked position according to FIG. 1.
Figure 6:
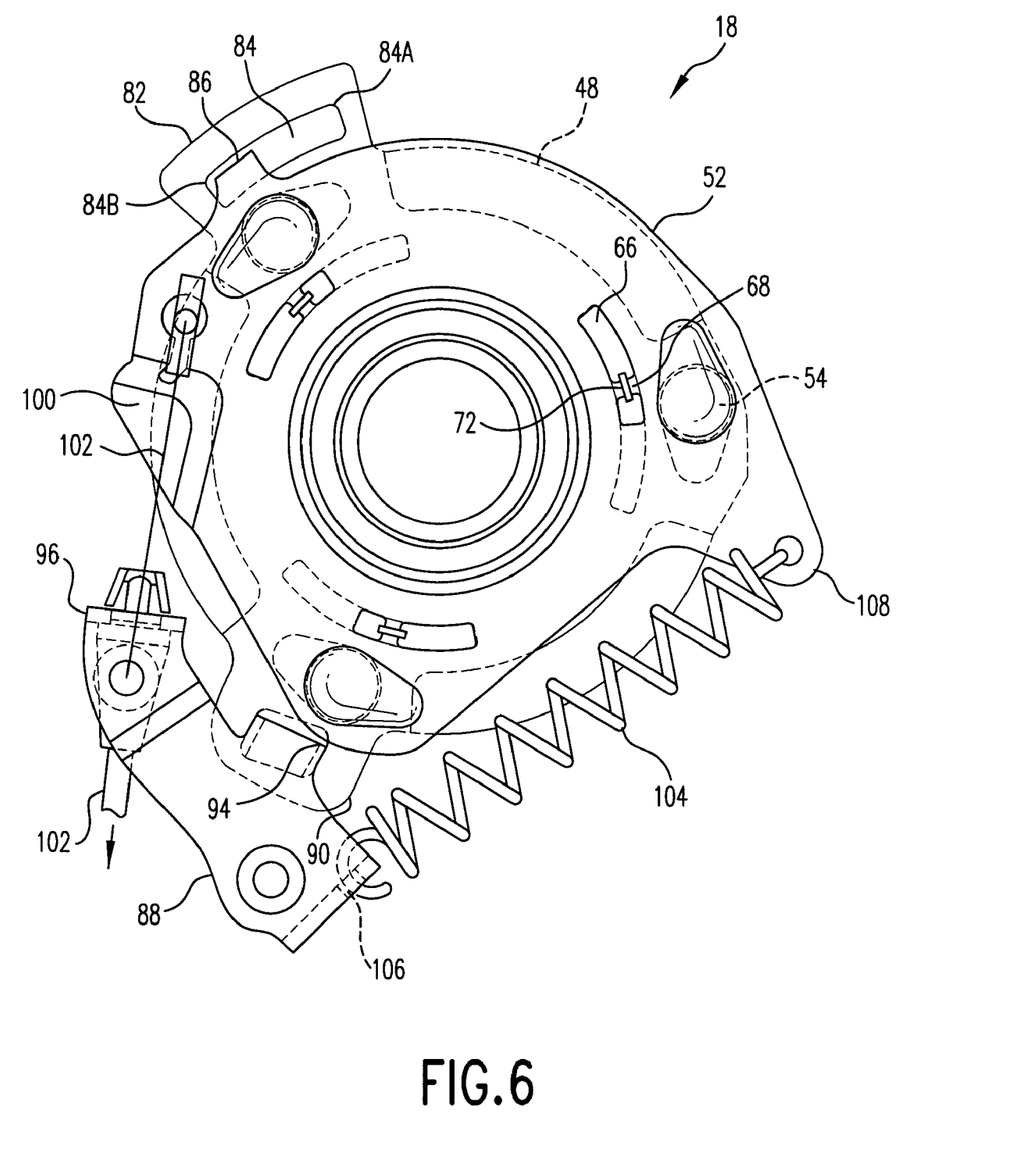
FIG. 6 illustrates an embodiment of the brake assembly of the embodiment of a centrifugal blade brake clutch apparatus in an actuated position according to FIG. 2.

For example, three ball ramp surface pairs can be used and located on brake member 48 and brake actuator 52 at points that form a triangular configuration as shown in FIGS. 5 and 6. Arcuate slots 70 of brake member 48 are positioned inward of and proximal to a corresponding ball ramp surface 78. Similarly, each arcuate slot 66 of brake actuator 52 is positioned inward of and proximal to a corresponding ball ramp surface 80. Hooks 72 of retainer 56 are thus located inward of and proximal to the brake ramp surfaces 78 and 80. This arrangement positions the hooks 72 close to the ball ramp surfaces 78, 80. With this arrangement, the force from compression spring 58 is located inward of the ball ramp surfaces 78, 80 and close to these ball ramp surfaces 78, 80. This arrangement creates better actuation between the ball ramp surfaces 78, 80, and the balls 54 contained therein. Also, the arrangement aids in containing the balls 54 between the respective ball ramp surfaces 78, 80. This enhances the performance of the brake assembly 18. However, hooks 72 can be located in other positions.

A tab 82 extends radially from the circumference of brake member 48. An arcuate tab slot 84 is formed in tab 82. Brake actuator 52 has a projection 86 that extends axially downward through tab slot 84. The width of projection 86 is less than the arcuate length of tab slot 84. As described further below, projection 86 can serve as an abutment and slot 84 can serve as stop. In other embodiments, the abutment can be on brake member 48 and the stop can be on the brake actuator 52.

Alternatively, other couplings that convert rotary motion to axial motion can be used instead of the ball ramp surface assemblies, such as a cam and follower assembly. Other embodiments can forgo any rotational motion of the brake actuator such a linkage system that provides a linearly displaceable link in contact with the brake member.

Referring to FIGS. 3, 5 and 6, a bracket 88 can be secured to a bracket tab 90 on brake member 48 by a post 92. Post 92 can extend axially downward through an opening 94 in bracket tab 92. Brake member 48 is free to move axially along post 92. Bracket 88 can be secured to a mounting surface, such as a mower deck or an engine block, by bolts or other suitable fastenings arrangements. Thus, bracket 88 can rotationally fix brake member 48. Alternatively, brake member 48 can be rotationally secured by a bolt or similar fastening arrangement.

The bracket 88 can include a guide flange 96 that defines a hole 98 therein. A projection 100 can extend axially upward from the top surface of brake actuator 52. One end of a control cable 102 can pass through hole 98 and guide flange 96 and can be secured to projection 100 by way of a slot or a hole or any other similar manner. The other end of control cable 102 can be secured to a control handle (not shown). Alternatively, control cable 102 can be secured at one end to a hole in brake actuator 52. A coil spring 104 can be secured at one end to bracket 88 at a recess 106. The other end of coil spring 104 can be secured to a spring tab 108 formed at the periphery of brake actuator 52. Recess 106 could be replaced by a hole or aperture in an alternate embodiment. Bracket 88 can include a plurality of ribs along its body to assist in the support of guide flange 96 and the flange containing recess 106. However, bracket 88 does not need to be provided with such ribs.

Bracket 88 can be a single element providing the functions of rotationally fixing brake member 48, anchoring control cable 102, and anchoring the coil spring 104. Such an embodiment of bracket 88, therefore, contributes to the reduction of parts for assembly.

Operation of the brake and clutch of the invention will now be described with references to FIGS. 1, 2, 5, and 6. FIG. 5 shows a top view of the brake assembly 18 in a braked position as shown in the cross-sectional view of FIG. 1. FIG. 6 shows a top view of brake assembly 18 in an actuated position as shown in the cross-section view of FIG. 2. Actuation of control cable 102 imparts a rotational motion to brake actuator 52. This, in turn, causes each ball ramp surface 80 to move relative to the associated ball 54. Each ball 54 rolls along the opposite inclined ball ramp surface 78 of brake member 48. This motion of the balls 54 forces the brake member 48 axially downward against the bias of compression spring 58 to engage braking surface 62 of brake member 48 with brake surface 46 of clutch housing 16 as can be seen in FIG. 2. Brake actuator 52 is in the braked position shown in FIG. 5 with the balls 54 rolled toward the narrow portions of inclined ramp surfaces 78, 80. At such point, the diameter of the balls 54 push brake member 48 away from brake actuator 52 as shown in FIG. 1 to engage the braking surface 62 of brake member 48 against the brake surface 46 of clutch housing 16. Actuation of control cable 102 can be performed once the rotational speed of the shaft and motor are lowered to an idle speed and clutch shoes 28 are disengaged from side walls 36 of clutch housing 16.

Thus, rotation of brake actuator 52 by displacement of control cable 102 and recoiling of spring 104 causes braking surface 62 of brake member 48 to axially contact brake surface 46 of clutch housing 16. This contact causes the braking of clutch housing 16 as clutch shoes 28 are pulled inward at the lower speed as shown in FIG. 1.

Actuation of control cable 102 in the opposite direction rotates brake actuator 52 in the opposite direction, which, in turn, displaces brake member 48 upward from brake surface 46 of clutch housing 16. This motion gradually disengages the braking surface 62 of brake member 48 from brake surface 46 of clutch housing 16. This rotation of brake actuator 52 moves it into an actuated position shown in FIG. 6 with balls 54 rolled toward the wider portions of the inclined ramp surfaces 78, 80. At this point, balls 54 permit brake member 48 to move toward brake actuator 52 as shown in FIG. 2 and braking surface 62 of brake member 48 to disengage brake surface 46 of clutch housing 16. The engine can then be sped up such that driving member 12 can be rotated at a higher speed causing clutch shoes 28 to extend outward from the centrifugal force caused by the weight of clutch shoes 28. Thereby, engagement surfaces 38 of clutch shoes 28 can engage clutch surface 40 of side walls 36 of clutch housing 16 as shown in FIG. 2.

Rotation of brake actuator 52 relative to the brake member 48 is limited by the interaction of projection 86 of brake actuator 52 with tab slot 84 of brake member 48. As seen in FIGS. 5 and 6, one end 84A of the tab slot 84 defines a first limit of brake actuator 52 and the other end 84B of tab slot 84 defines a second limit of brake actuator 52. When brake actuator 52 is in the first limit position at end 84A as shown in FIG. 5, the brake shoe 60 is engaged with brake surface 46 of clutch housing 16. When brake actuator 52 is in the second limit position at end 84B as shown in FIG. 6, brake shoe 60 is disengaged from brake surface 46 of clutch housing 16.

The force exerted by coil spring 104 through the actuation of control cable 102 is directed on brake actuator 52 in such a manner as to overcome the bias of compression spring 58. Thus, coil spring 104 biases brake actuator 52 towards the first limit position. This ensures that the brake member 48 brakes clutch housing 16 against rotation until an operator provides input to brake actuator 52 through control cable 102.

In this manner, a brake assembly 18 is positioned proximal to clutch housing 16 with the axis of clutch housing 16 passing therethrough. Brake member 48 is movable in a direction along the axis of clutch housing 16 to axially engage brake surface 46 of clutch housing 16 with braking surface 62 of brake member 48. The movement of brake member 48 can be in a direction parallel with the axis. Further, as stated above, clutch housing 16 and brake assembly 18 can be coaxially aligned along the axis.

Figure 7:
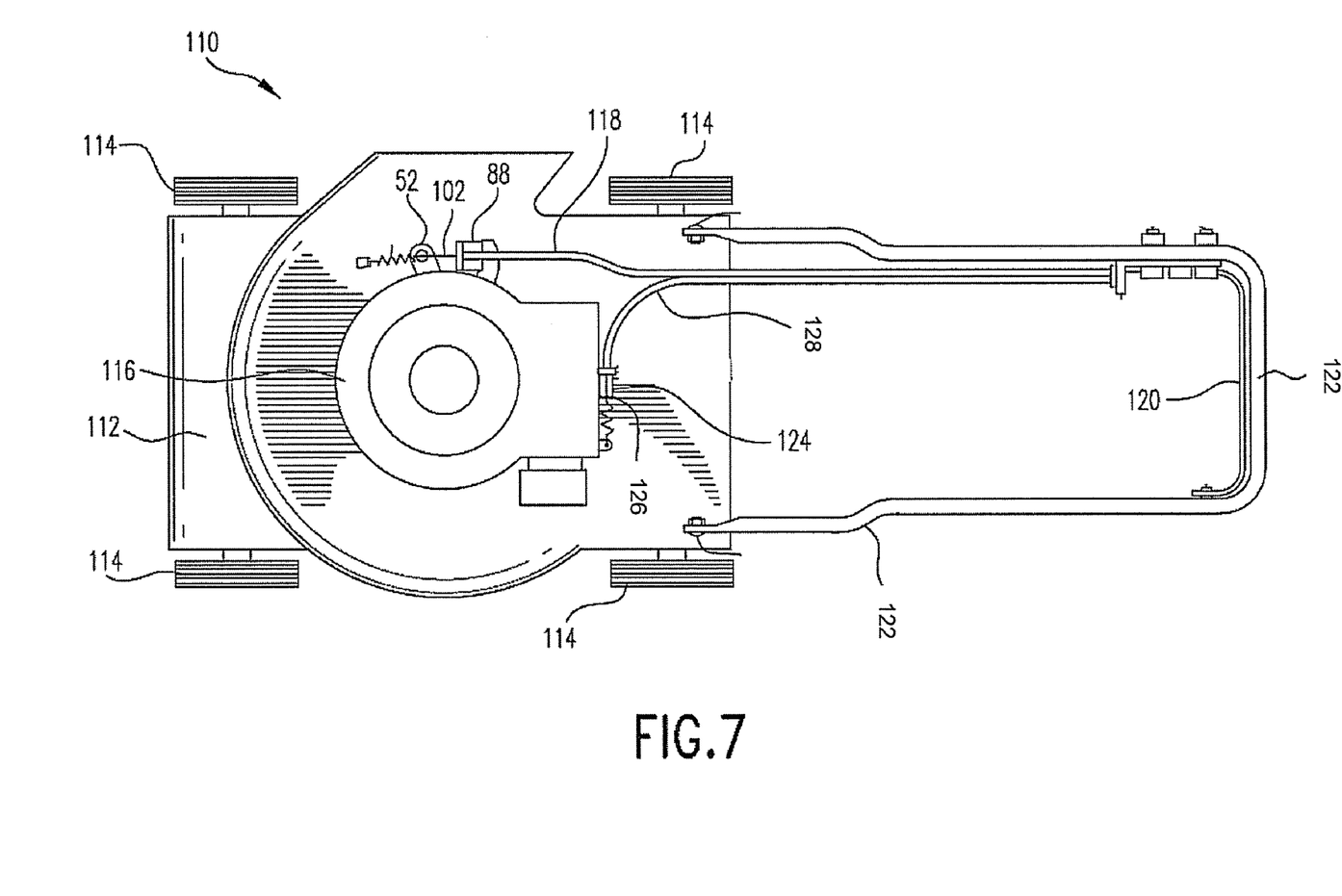
FIG. 7 illustrates a top plan view of a lawnmower using an embodiment of a centrifugal blade brake clutch apparatus according to the present subject matter.

In operation, an actuation device such as an actuation cable can be used to increase throttle of the engine, thereby increasing the rotational motion of the driving member 12 to actuate the centrifugal clutch through clutch shoes 28 and clutch housing 16. A second cable can then be used to control the coupling between brake member 48 and brake surface 46 of clutch housing 16. FIG. 7 shows a lawnmower, generally designated as 110. Lawnmower 110 includes a housing 112 and wheels 114 mounted thereon to allow housing 112 to roll on the lawn to be cut. Lawnmower 110 also includes an engine 116 mounted on housing 112 used to transfer power to a driving, member 12 through a power take-off pulley 24 as shown in FIGS. 1 and 2. Alternatively, the driving member 12 can be rotated by engine 116 directly. Control cable 102 is secured to a brake actuator 52 by way of bracket 88 to control a braking assembly 18 as shown in FIGS. 1 and 2. Control cable 102 runs through sheath 118 up to a bail 120 on a handle 122 of lawnmower 110.

Similarly, a control cable 124 is connected to a throttle 126 of engine 116. Control cable 124 runs through a sheath 128 up to bail 120 on lawnmower handle 122. In this manner, both control cable 102, which is used to control brake assembly 18 (see FIGS. 5 and 6) and control cable 124 used to control the throttle 126, and thus the speed of the engine 116, are connected to bail 120 on handle 122 of lawnmower 110. As is commonly known in the art, bail 120 that operates as an operator presence control mechanism can be held down against handle 122 in order to activate the blade for cutting. In this manner, the blade only spins when an operator is present and is in a position to hold down bail 120 onto handle 122.

A mechanism such as bail 120 helps to prevent accidents due to the blade of lawnmower 110 rotating when an operator is not in a position to control lawnmower 110. For example, when bail 120 is in an up position, control cable 124 attached to throttle 126 will allow engine 116 to remain at a lower speed in which the blade of lawnmower 110 is not engaged, and, is thus idle. Lawnmower 110 can idle at such a lower speed without the blade ever being engaged. Further, when bail 120 is in an up position away from handle 122, control cable 102 is actuate such that brake actuator 52 is in the first limit position, thereby causing brake member 48 with its braking surface 62 to engage brake surface 46 of clutch housing 16 as shown in FIGS. 1 and 5.

To actuate the blade as described above, the operator can pull the bail 120 downwardly toward handle 122. In this manner, control cable 124 is pulled downwardly thereby pulling throttle 126 from an idle position to a high speed position. When throttle 126 is increased, engine 116 operates at a higher speed. At the same time, control cable 102 is also pulled forward thereby actuating actuator 52 into its second limit position. In the second limit position, actuator 52 allows brake member 48 to raise thereby releasing braking surface 62 of brake member 48 from brake surface 46 of clutch housing 16 (see FIGS. 2 and 6). As throttle 126 increases the engine speed and brake member 48 is released from clutch housing 16, engine 116 rotates driving member 12 at a higher rate of speed, which causes clutch shoes 28 contained on drive hub 22 to extend radially outward under the centrifugal force created by the weight of clutch shoes 28 as shown in FIG. 2. Clutch shoes 28 overcome the bias of springs 34 so that clutch shoes 28 with their engagement surfaces 38 engage clutch surface 40 of side walls 36 of clutch housing 16 thereby causing clutch housing 16 to rotate at the same speed as drive member 12. This rotation of clutch housing 16, in turn, causes the blade attached to clutch housing 16 to rotate at its appropriate speed as well.

If the operator needs to leave lawnmower 110 but does not desire to turn the engine off, the operator can release bail 120 thereby letting bail 120 raise to the up position. In the up position of bail 120, throttle 126 lowers the engine speed through control cable 124 and brake assembly 18 engages brake surface 46 of clutch housing 16 (shown in FIGS. 1 and 2) through control cable 102. In this manner, the engine is not cut off but the blade has been disengaged and has stop turning, thereby making it safe for the operator to walk away from the machine. Since the motor can still run at a lower idle speed without the blade turning, the operator does not have to restart the machine due to the fact that the engine is not cut off by the releasing of bail 120.

Embodiments of the present disclosure shown in the drawings and described above are exemplary of numerous embodiments that can be made within the scope of the appending claims. It is contemplated that the configurations of the centrifugal brake clutch can comprise numerous configurations other than those specifically disclosed. The scope of a patent issuing from this disclosure will be defined by these appending claims.

What is claimed is:

1. A centrifugal blade brake clutch comprising:
    a rotatable clutch housing comprising a base and side walls with an axis extending therethrough, the clutch housing comprising a brake surface thereon and a clutch surface disposed on a surface of the side walls;
    at least one centrifugally extendable clutch shoe disposed within the clutch housing and configured for engaging the clutch surface on the side walls of the clutch housing; and
    a brake assembly positioned proximal to the clutch housing with the axis of the clutch housing passing therethrough, the brake assembly comprising a brake member comprising a braking surface and the brake member being movable in a direction along the axis of the clutch housing to axially directly engage the brake surface of the clutch housing with the braking surface of the brake member.

2. The centrifugal blade brake clutch according to claim 1, wherein the clutch housing and brake assembly are coaxially aligned.

3. The centrifugal blade brake clutch according to claim 1, wherein the brake surface of the clutch housing is integrally disposed on a top portion of the side walls distal from the base of the clutch housing.

4. The centrifugal blade brake clutch according to claim 1, further comprising at least one bias element attached to the at least one clutch shoe biasing the clutch shoe away from the clutch surface of the clutch housing.

5. The centrifugal blade brake clutch according to claim 1, further comprising a drive hub having the at least one clutch shoe retractably and extendably secured thereon.

6. The centrifugal blade brake clutch according to claim 1, wherein the drive hub further comprises at least one wing configured to be insertable into a channel within the at least one clutch shoe.

7. The centrifugal blade brake clutch according to claim 1, wherein the brake assembly further comprises a brake actuator connected to the brake member.

8. The centrifugal blade brake clutch according to claim 7, wherein the brake actuator is configured to rotate to move the brake member in the direction along with the axis of the clutch housing.

9. The centrifugal blade brake clutch according to claim 7, further comprising at least one ball ramp assembly connecting the brake actuator to the brake member and a spring between the brake actuator and the brake member.

10. The centrifugal blade brake clutch according to claim 9, further comprising an abutment on one of the brake member or the brake actuator and a stop on the other of the brake member or the brake actuator.

11. The centrifugal blade brake clutch according to claim 10, wherein the abutment is a projection extending from the brake actuator and the stop is a slot formed in the brake member wherein the projection extends into the slot.

12. The centrifugal blade brake clutch according to claim 9, wherein each of the at least one ball ramp assemblies comprises:
    an inclined ball ramp surface on each of the brake member and the brake actuator, wherein each of the ball ramp surfaces on the brake member opposes and is inclined opposite to a corresponding one of the ball ramp surfaces on the brake actuator; and
    a ball between and in contact with each of the opposing ball ramp surfaces.

13. The centrifugal blade brake clutch according to claim 7, wherein the brake assembly further comprises a retainer connected to the brake actuator for holding the brake member proximal to the brake actuator.

14. The centrifugal blade brake clutch according to claim 7, further comprising a bracket secured to the brake member, the bracket including: a guide member; a spring connected at one end to the brake actuator and at a second end to the bracket; a flange formed on the brake actuator; and a link extending through the guide member and connected to the flange.

15. A drive assembly comprising:
    a driving member comprising an axis extending therethrough;

a clutch housing rotatably disposed on the driving member with the clutch housing comprising the axis of the driving member passing therethrough, the clutch housing comprising a base and side walls and the clutch housing comprising a brake surface thereon and a clutch surface disposed on a surface of the side walls;

at least one centrifugally extendable clutch shoe disposed within the clutch housing and configured for engaging the clutch surface on the side walls of the clutch housing; and a brake assembly disposed on the driving member with the axis of the driving member passing therethrough and positioned proximal to the clutch housing, the brake assembly comprising a brake member comprising a braking surface and the brake member being movable in a direction along the axis of the driving member to axially directly engage the brake surface of the clutch housing with the braking surface of the brake member.

16. The drive assembly according to claim 15, wherein the clutch housing and brake assembly are coaxially aligned with the driving member.

17. The drive assembly according to claim 15, wherein the brake surface of the clutch housing is integrally disposed on a top portion of the side walls distal from the base.

18. The drive assembly according to claim 15, further comprising at least one bias element attached to the at least one clutch shoe biasing the clutch shoe away from the clutch surface of the clutch housing.

19. The drive assembly according to claim 15, further comprising a drive hub secured to the driving member, the drive hub having the at least one clutch shoe retractably and extendably secured thereon.

20. The drive assembly according to claim 15, wherein the drive hub further comprises at least one wing configured to be insertable into a channel within the at least one clutch shoe.

21. The drive assembly according to claim 15, wherein the brake assembly further comprises a brake actuator connected to the brake member.

22. The drive assembly according to claim 21, wherein the brake actuator is configured to rotate to move the brake member in the direction along the axis of the driving member.

23. The drive assembly according to claim 21, further comprising at least one ball ramp assembly connecting the brake actuator to the brake member and a spring between the brake actuator and the brake member.

24. The drive assembly according to claim 23, further comprising an abutment on one of the brake member or the brake actuator; and a stop on the other of the brake member or the brake actuator.

25. The drive assembly according to claim 24, wherein the abutment is a projection extending from the brake actuator and the stop is a slot formed in the brake member wherein the projection extends into the slot.

26. The drive assembly according to claim 23, wherein each ball ramp assembly comprises:
an inclined ball ramp surface on each of the brake member and the brake actuator, each of the ball ramp surfaces on the brake member opposes and is inclined opposite to a corresponding one of the ball ramp surfaces on the brake actuator; and
a ball between and in contact with each of the opposing ball ramp surfaces.

27. The drive assembly according to claim 21, wherein the brake assembly further comprises a retainer connected to the brake actuator for holding the brake member proximal to the brake actuator.

28. The drive assembly according to claim 21, further comprising a bracket secured to the brake member, the bracket including a guide member; a spring connected at one end to the brake actuator and at a second end to the bracket; a flange formed on the brake actuator; and a link extending through the guide member and connected to the flange.

29. A method of clutching for power equipment, the method comprising:
rotating a driving member about an axis;
extending at least one clutch shoe outward from the driving member due to the rotation of the driving member;
engaging a clutch housing with the at least one clutch shoe causing the clutch housing to rotate with the at least one clutch shoe and the driving member; and
selectively braking the clutch housing by moving a brake member of a brake assembly in an axial direction along the axis of the drive member such that a braking surface of the brake member contacts a brake surface of the clutch housing.

30. The method according to claim 29, further comprising biasing the clutch shoe away from the clutch housing with a bias element.

31. The method according to claim 29, further comprising rotating a brake actuator to move the brake member in the direction along with the axis of the driving member.

32. A method of clutching for power equipment, the method comprising:
providing a drive assembly for rotating a blade comprising:
a driving member comprising an axis extending therethrough;
a clutch housing rotatably disposed on the driving member with the clutch housing comprising the axis of the driving member passing therethrough, the clutch housing comprising a base and side walls and the clutch housing comprising a brake surface thereon and a clutch surface disposed on a surface of the side walls;
at least one centrifugally extendable clutch shoe disposed within the clutch housing and configured to extend from the drive member and engage the clutch surface on the side walls of the clutch housing; and
a brake assembly disposed on the driving member with the axis of the driving member passing therethrough and positioned proximal to the clutch housing, the brake assembly comprising a brake member comprising a braking surface and configured to move in a direction along the axis of the driving member;
rotating the driving member;
extending the at least one clutch shoe outward from the driving member due to the rotation of the driving member;
engaging the clutch housing with the at least one clutch shoe causing the clutch housing to rotate with the at least one clutch shoe and the driving member; and
selectively braking the clutch housing by moving the brake member of the brake assembly in an axial direction along the axis of the drive member such that the braking surface of the brake member contacts the brake surface of the clutch housing.

33. The method according to claim 32, further comprising biasing the clutch shoe away from the clutch housing with a bias element.

34. The method according to claim 32, further comprising rotating a brake actuator to move the brake member in the direction along with the axis of the driving member.

* * * * *